US 8,683,548 B1

(12) United States Patent
Curry et al.

(10) Patent No.: US 8,683,548 B1
(45) Date of Patent: Mar. 25, 2014

(54) COMPUTING WITH POLICY ENGINE FOR MULTIPLE VIRTUAL MACHINES

(75) Inventors: Samuel Curry, North Andover, MA (US); Daniel Schiappa, Bedford, NH (US)

(73) Assignee: EMC Corporation, Hopkinton, MA (US)

( * ) Notice: Subject to any disclaimer, the term of this patent is extended or adjusted under 35 U.S.C. 154(b) by 164 days.

(21) Appl. No.: 13/249,484

(22) Filed: Sep. 30, 2011

(51) Int. Cl.
*G06F 17/00* (2006.01)

(52) U.S. Cl.
USPC ............. 726/1; 726/14; 713/152; 713/153; 718/100

(58) Field of Classification Search
None
See application file for complete search history.

(56) References Cited

U.S. PATENT DOCUMENTS

| | | | |
|---|---|---|---|
| 8,332,632 B2 | 12/2012 | Iftode et al. | |
| 2002/0029308 A1* | 3/2002 | Babaian et al. | 710/240 |
| 2009/0007100 A1* | 1/2009 | Field et al. | 718/1 |
| 2011/0145820 A1* | 6/2011 | Pratt et al. | 718/1 |
| 2011/0239291 A1* | 9/2011 | Sotka | 726/14 |
| 2012/0198514 A1 | 8/2012 | McCune et al. | |

FOREIGN PATENT DOCUMENTS

WO 2007/087558 A2 8/2007

OTHER PUBLICATIONS

"Protect Sensitive Data on Laptops—Even for Disconnected Users," Citrix, White Paper, dowloaded from http://www.intel.com/content/dam/www/public/us/en/documents/white-papers/citrix-xenclient-virtualization-security-paper.pdf, dowloaded on Feb. 13, 2013.

* cited by examiner

*Primary Examiner* — Shewaye Gelagay
(74) *Attorney, Agent, or Firm* — BainwoodHuang

(57) ABSTRACT

An improved technique for delegating computing actions among different machines includes a policy engine that receives inputs specifying computing actions to be performed and automatically selects a virtual machine to perform each action. Machine selection is based on a policy, which recognizes multiple categories of computing actions, classifies each input as belonging to one of the categories, and directs each computing action to a virtual machine designated for performing only that one category of computing actions.

21 Claims, 5 Drawing Sheets

COMPUTING WITH POLICY ENGINE FOR MULTIPLE VIRTUAL MACHINES

BACKGROUND

Red/Green security provides a technique for protecting sensitive data and keeping computers and networks secure. In a conventional Red/Green security scheme, one computer is designated as a "Green" computer and another computer is designated as a "Red" computer.

The Green computer is a trusted system. It has generally been verified to be free of viruses and other malware. To maintain its trusted status, the Green computer is generally limited to known-safe operations and networks. For example, in some arrangements, the Green computer may be prohibited from connecting to the Internet and may be allowed to visit only a limited set of locations on an isolated network. In other arrangements, the Green computer is allowed to connect to the Internet, but is limited to visiting only a designated set of websites. The Green computer is also generally limited to particular applications and may prohibit users from installing new applications.

In contrast, the Red computer is not trusted. It is permitted to perform a much wider range of activities than the Green computer. These include visiting most websites and installing and running applications that have not been verified as safe. The Red computer is assumed to be compromised and is therefore isolated from any Green computers to prevent the flow of information (including malware) between Red computers and Green computers.

SUMMARY

Conventionally, users of systems protected by Red/Green security are required to physically switch between one computer, designated as Green, for performing trusted activities, and another computer, designated as Red, for performing un-trusted activities.

More recently, Green and Red computers have been realized using virtual machines. As is known, "virtual machines" are software realizations of computers that execute programs like physical machines. Multiple virtual machines can be run concurrently on a single physical machine; they can also be moved among different physical machines. Each virtual machine typically appears to users to be its own complete computer.

Unfortunately, whether physical or virtual machines are used, conventional Red/Green security schemes still require users to switch manually between Red and Green machines. For instance, a user may be required to access a certain trusted website using a Green machine, but may then be required to switch over to using a Red machine to visit any untrusted sites.

Requiring users to switch continually between machines can cause difficulties. First, users are inconvenienced. The process of remembering to switch machines, and then actually moving from one machine to another, consumes some of the users' time and attention. Users can become confused as to which machines to use for which actions, and may have to rely on the machines themselves to police their own activities. If a user enters a URL on one machine, and the machine prohibits visiting the specified website, then the user has to recognize the problem, switch over to the other machine, and reenter the URL. Users may become impatient if they are required to switch between machines frequently, and their productivity may suffer.

Second, requiring users to switch manually between machines can present a security risk, which undermines the purpose of Red/Green security. Red/Green security relies on an accurate delegation of trusted computing activities to Green machines and un-trusted computing activities to Red machines. In the conventional scheme, however, no single authority controls the delegation. Rather, two computers may each be relied upon to keep complete lists of activities that are allowed or prohibited. If the lists are not coordinated between the machines, a Red machine might visit a Green site, or vice-versa, causing a failure in security.

An improved technique for delegating computing actions among different machines overcomes the inconvenience and security risks associated with prior implementations by providing a policy engine that receives inputs specifying computing actions to be performed and automatically selects a machine to perform each action. Machine selection is based on a policy, which recognizes multiple categories of computing actions, classifies the action specified by each input as belonging to one of the categories, and directs each computing action to a machine designated for performing only that one category of computing actions.

In some embodiments, the machines are virtual machines and the delegation of computing actions is performed by a policy engine which itself is implemented as a service virtual machine ("service VM"). Where Red/Green computing is used, one virtual machine is designated as Red and another is designated as Green. The policy engine automatically directs trusted actions to the Green virtual machine and untrusted actions to the Red virtual machine.

The automatic selection of machines avoids requiring users to switch manually between machines. In addition, the policy engine provides a single location for processing policy information for all categories of machines. Any security risk associated with different machines having different policies is therefore avoided.

Certain embodiments are directed to a processing method for a virtual machine environment. The method includes receiving multiple inputs, each input specifying a computing action to be performed, and classifying the computing action specified by each input in one of multiple predetermined categories of computing actions in accordance with a policy of the virtual machine environment. The method further includes directing the computing action specified by each input to be performed by a virtual machine configured for performing only the category of computing actions specified by the respective input, including directing computing actions of different categories to different virtual machines.

Some embodiments are directed to a processing apparatus for a virtual machine environment. The apparatus includes an input device and a controller. The controller is coupled to the input device and has a memory and at least one processor, coupled to the memory, for processing information stored in the memory. The controller is constructed and arranged to receive multiple inputs, via the input device, each input specifying a computing action to be performed, and to classify the computing action specified by each input in one of multiple predetermined categories of computing actions in accordance with a policy of the virtual machine environment. The apparatus is further constructed and arranged to direct the computing action specified by each input to be performed by a virtual machine configured for performing only the category of computing actions specified by the respective input, including directing computing actions of different categories to different virtual machines.

Other embodiments are directed to a computer program product that includes a non-transitory computer readable medium. The medium stores instructions which, when executed by a processor, cause the processor to perform a method of processing inputs in a virtual machine environment. The method includes receiving multiple inputs, each input specifying a computing action to be performed, and classifying the computing action specified by each input in one of multiple predetermined categories of computing actions in accordance with a policy of the virtual machine environment. The method further includes directing the computing action specified by each input to be performed by a virtual machine configured for performing only the category of computing actions specified by the respective input, including directing computing actions of different categories to different virtual machines.

BRIEF DESCRIPTION OF THE DRAWINGS

The foregoing and other features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention. In the drawings.

DETAILED DESCRIPTION

An improved technique for Red/Green security and other types of processing employs a policy engine. The policy engine receives inputs. Each input specifies a computing action to be performed. The policy engine classifies each computing action in one of a set of predetermined categories and directs the specified action to a virtual machine for processing. The virtual machine to which the action is directed is configured for performing only the category of computing actions specified by the respective input.

In one example, Red/Green security is implemented with a policy engine and two virtual machines. One of the virtual machines is designated for trusted computing actions (Green) and the other is designated for un-trusted computing actions (Red). If the policy engine determines that a computing action specified by an input is trusted, the policy engine directs the action to the Green virtual machine for processing. Otherwise, the policy engine directs the action to the Red virtual machine.

Figure 1:
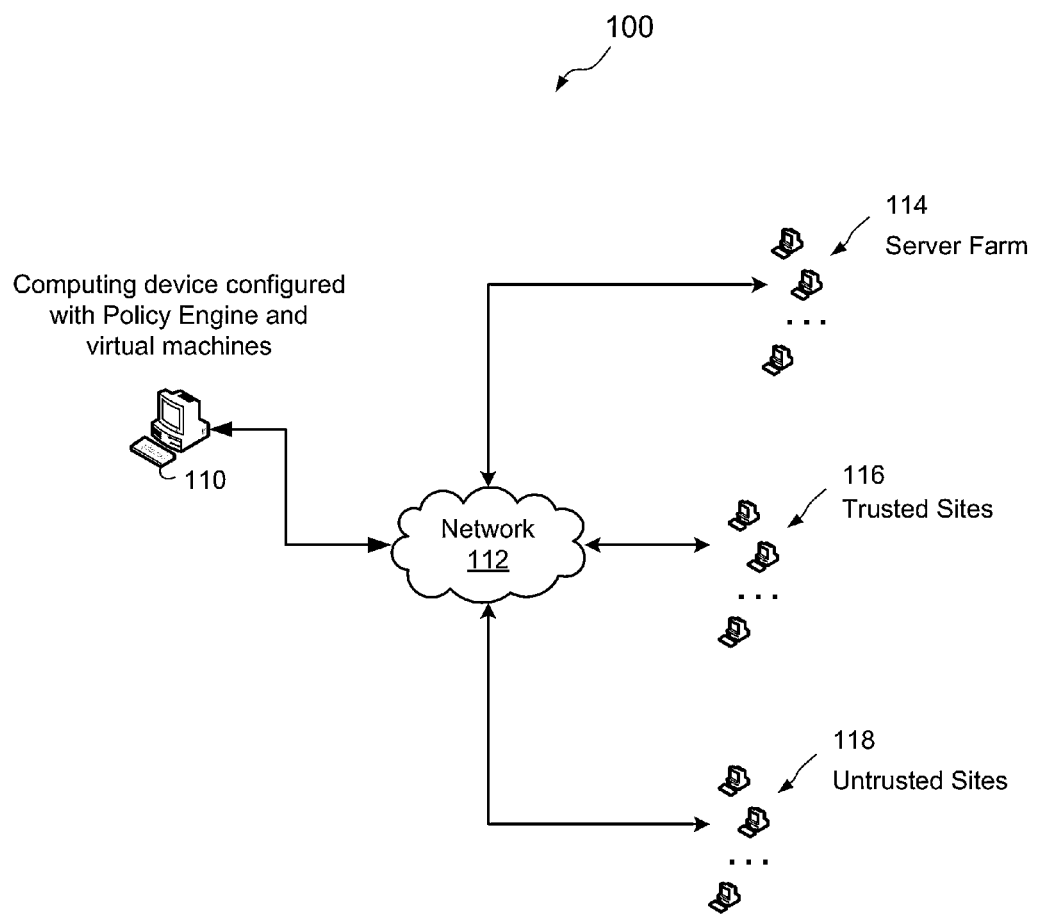
FIG. 1 is a schematic diagram showing an example environment in which Red/Green security employing a policy engine can be used.

FIG. 1 shows an example system 100 for implementing Red/Green security with a policy engine and virtual machines. The system 100 includes a computing device 110 configured with a policy engine and virtual machines. The computing device 110 is connected to a network 112. The network 112 can also be connected to a server farm 114, a number of trusted sites 116, and a number of un-trusted sites 118.

A user of the computing device 110 can enter inputs. The policy engine receives the inputs, classifies them as trusted or un-trusted, and transfers them respectively to a green virtual machine or a red virtual machine for processing.

In some examples, the virtual machines are all run on the computing device 110. In other examples, the virtual machines are located on one or more other computing devices (such as one or more of the servers in the server farm 114) or are distributed among the computing device 110 and other computing devices.

In some examples, the computing device 110 is a server equipped with a policy engine; however, it can be any type of computing device equipped with a policy engine, such as a desktop computer, workstation, laptop computer, tablet computer, smart phone, PDA, gaming console, or set-top box, for example. The network 112 can be any type of network, such as a the Internet, a local area network, a wide area network, a satellite network, a telephone network, a cable television network, a virtual network, or a combination of any of the above, for example. The sites 116 and 118 can be any type of sites, such as websites, FTP sites, other types of sites, or other machines (physical or virtual) on the network 112.

Figure 2:
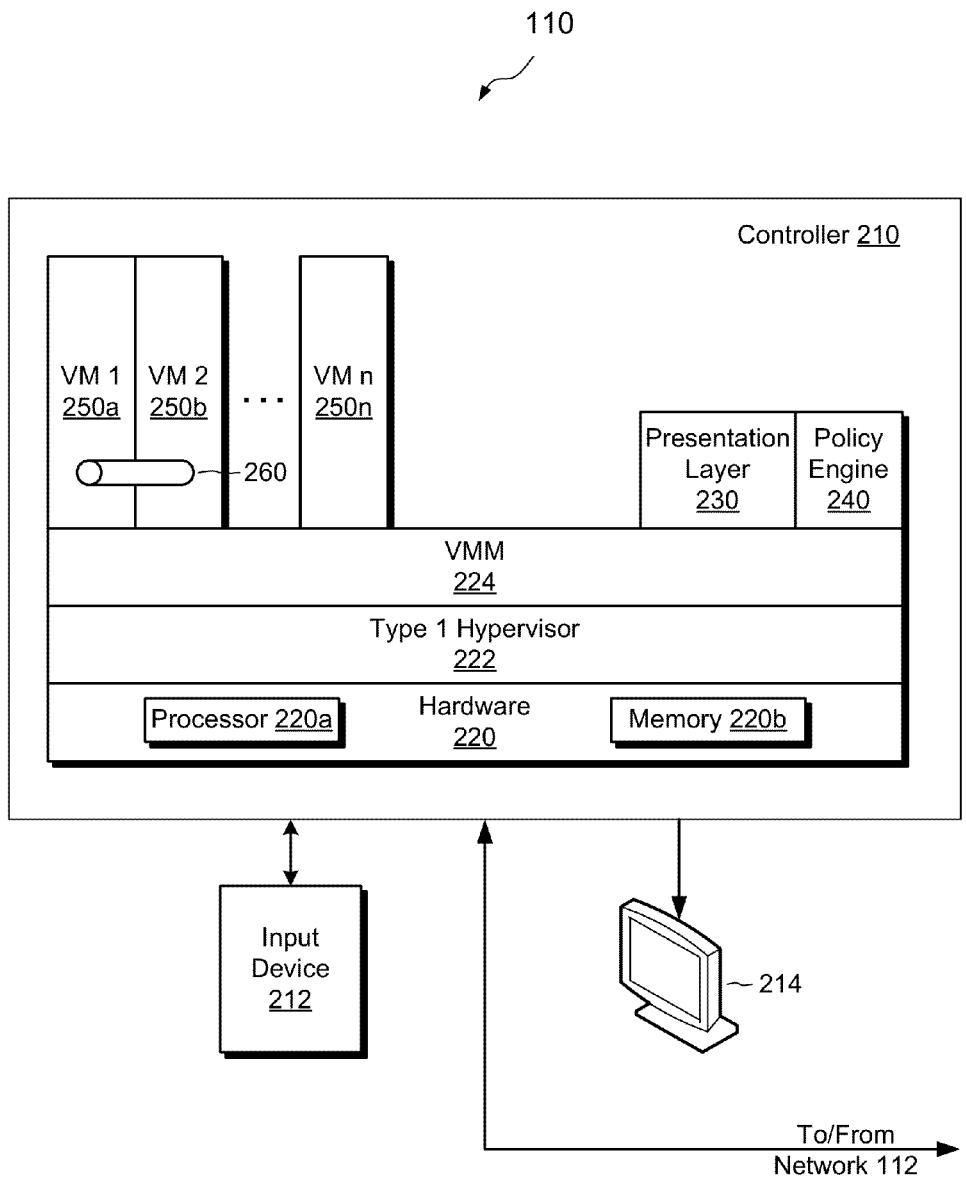
FIGS. 2 and 3 are block diagrams showing an example computing device for implementing Red/Green security with a policy engine.

FIG. 2 shows an example hardware and software stack of the computing device 110, which includes a policy engine 240 and other components with which the policy engine 240 can interact to realize a Red/Green security or other type of categorization technique. The computing device 110 includes a controller 210, an input device 212, and a display 214. The controller 210 includes hardware 220 and software. The hardware 220 includes one or more processors 220$a$ and memory 220$b$. The memory 220$b$ includes both temporary memory, such as RAM, and long-term memory, such as disk drives, flash memory, and the like. The software typically includes a Type 1 hypervisor 222, a virtual memory manager (VMM) 224, a presentation layer 230, the policy engine 240, virtual machines 250$a$-$n$, and an airlock 260.

As will be described more fully, the policy engine 240 is a software construct that assigns computing actions designated by inputs to the virtual machines 250$a$-250$n$ for processing. The policy engine 240 operates based on a predetermined policy.

The Type 1 hypervisor 222 and the VMM 224 are commercially available software components known to those skilled in the art. The presentation layer 230 is a software component which receives user inputs and renders outputs for presentation to users. The virtual machines 250$a$-250$n$ are typically each provided with a guest operating system, such as the Microsoft Windows™ operating system, as well as user applications, non-limiting examples of which can include a browser and an email program. Each virtual machine 250$a$-250$n$ preferably runs in its own container that encapsulates virtual hardware resources and user applications. Each of the virtual machines 250$a$-250$n$ is preferably connected to its own virtual network, and the virtual networks of the different virtual machines are isolated from one another.

The input device 212 can be any device or devices for receiving user input, such as a keyboard, a pointer device, a touch pad, a touch screen, or any combination of these items, for example. The controller 210, input device 212, and display 214 can be provided as separate components. Alternatively, they can be integrated into a single unit or multiple units.

Although the virtual machines 250$a$-250$n$ are preferably run in separate containers and on separate virtual networks that do not directly exchange data, it is possible, under some circumstances, for data to be moved from one virtual machine to another. Airlock 260 depicts this type of transfer. The airlock 260 as shown is typically not a software component of the controller 210, but rather a process whereby a user can copy information from one virtual machine to another. Transfer of information can occur, for example, when a user copies information provided from one virtual machine (e.g., Green or Red) and attempts to paste the information into another virtual machine. The information can be in any form, such as ASCII characters, files, or folders, for example. In response to the user initiating the "paste" command, the policy engine 240 is invoked. The policy engine 240 subjects the copied information to a set of policy tests based on its predetermined criteria. The policy engine 240 allows the pasting operation to proceed if the criteria allow transfer of the copied information (e.g., if none of the policy tests identify a policy violation). However, the policy engine 240 prohibits the information from being pasted if the criteria do indicate a policy violation (e.g., if any of the policy tests identify a violation).

It should be noted that the airlock 260 itself confers a significant advance in Red/Green, virtual machine implementations. Some prior implementations provide mechanisms for transferring data between Red and Green virtual machines, but they do not first verify that the data to be transferred is allowed to cross the Red/Green barrier. These prior mechanisms thus introduce a security risk, as they can allow Red and Green content to be intermingled. However the presence of the airlock 260, which distinguishes trusted content from untrusted content and blocks untrusted content eliminates this security risk and promotes enhanced security.

In the arrangement described, the controller 210 is implemented using hardware 220 that runs software constructs, and thereby forms a specialized circuit when executing the hypervisor 222, VMM 224, presentation layer 230, policy engine 240, and virtual machines 250a-250n. In other arrangements, the hypervisor 222, VMM 224, presentation layer 230, policy engine 240, and virtual machines 250a-250n are implemented, in whole or in part, using one or more Application-Specific Integrated Circuits (ASICs), Field-Programmable Gate Arrays (FPGAs), or other types of circuits. As will become apparent, the computing device 110 provides a virtual machine environment wherein virtual machines can be created, managed, and destroyed.

Figure 3:
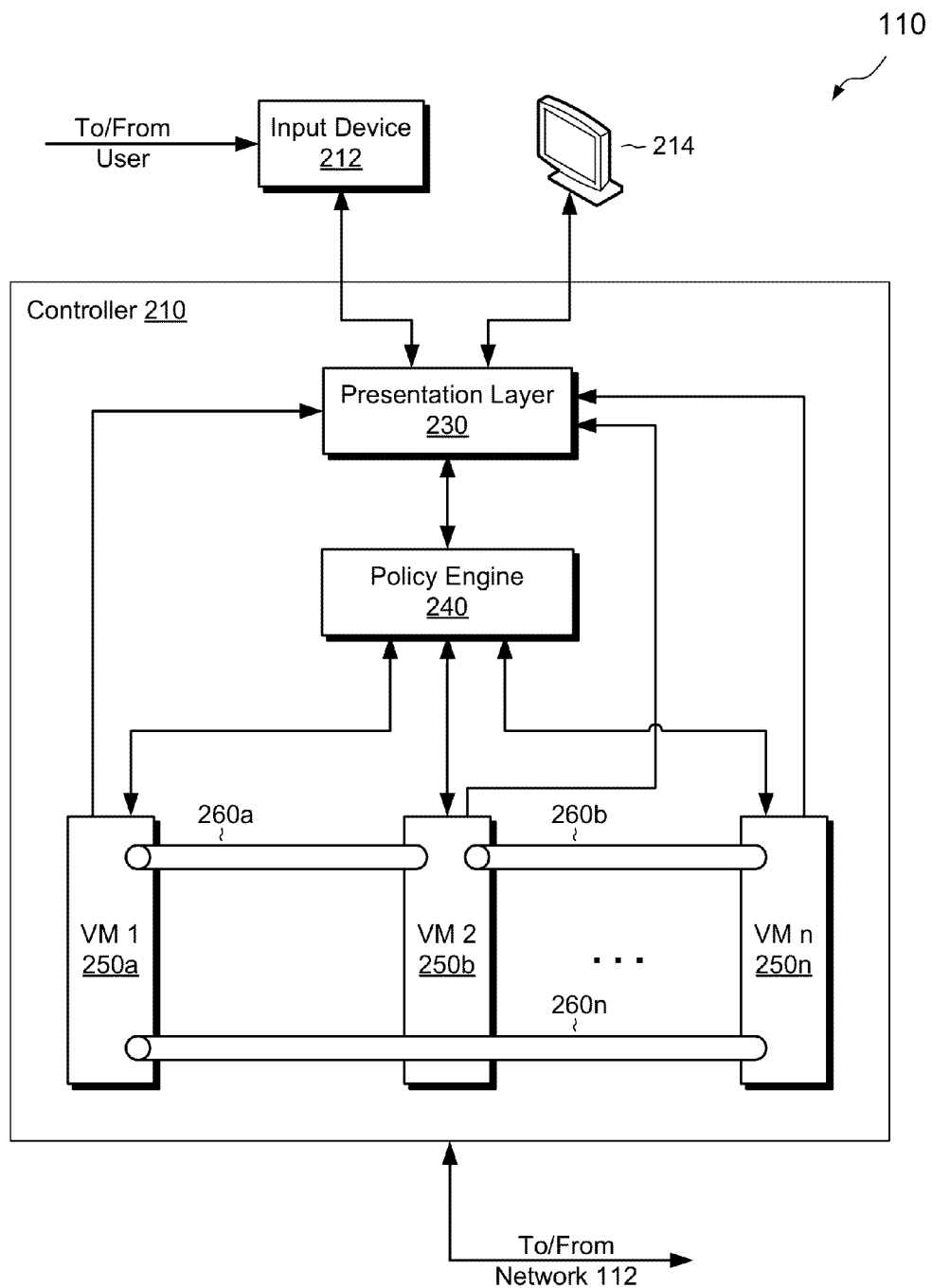

FIG. 3 shows information flow in the computing device 110. The input device 212 receives an input from a user and provides the input to the presentation layer 230. The presentation layer 230 passes the input to the policy engine 240. The policy engine 240 identifies the computing action specified by the input and classifies the computing action in one of a predetermined set of categories. The policy engine 240 then directs the input to the virtual machine that has been designated for a category that matches the category of the input. The virtual machine processes the input and generates an output, which is sent back to the presentation layer 230 for presentation to the user (e.g., via the display 214). Airlocks 260a-n are preferably provided between the virtual machines, with each virtual machine having an airlock to each other virtual machine. The policy engine 240 can thereby regulate movement of data among all virtual machines 250a-250n.

For implementing Red/Green security, the set of categories may include as few as two elements—trusted and untrusted. Thus, one of the virtual machines (e.g., 250a) is designated for trusted (Green) computing actions and another (e.g., 250b) is designated for untrusted (Red) computing actions. The policy engine 240 then directs inputs specifying trusted computing actions to the Green virtual machine 250a and directs inputs specifying untrusted computing actions to the Red virtual machine 250b.

Although only two virtual machines are typically used for Red/Green security, additional virtual machines can be provided for handling other classifications of computing actions. In one example, a third category can be used with Red/Green security, which covers classified or other types of information. In another example, additional "colors" of machines can be provided besides Red and Green. A "Purple" virtual machine can be included, for example, for handling computing actions deemed to fall somewhere between Red and Green. More generally, any number of virtual machines 250a-250n can be provided, depending on the number of categories in the set of categories and limited only by the hardware constraints of the computing device 110.

Figure 4:
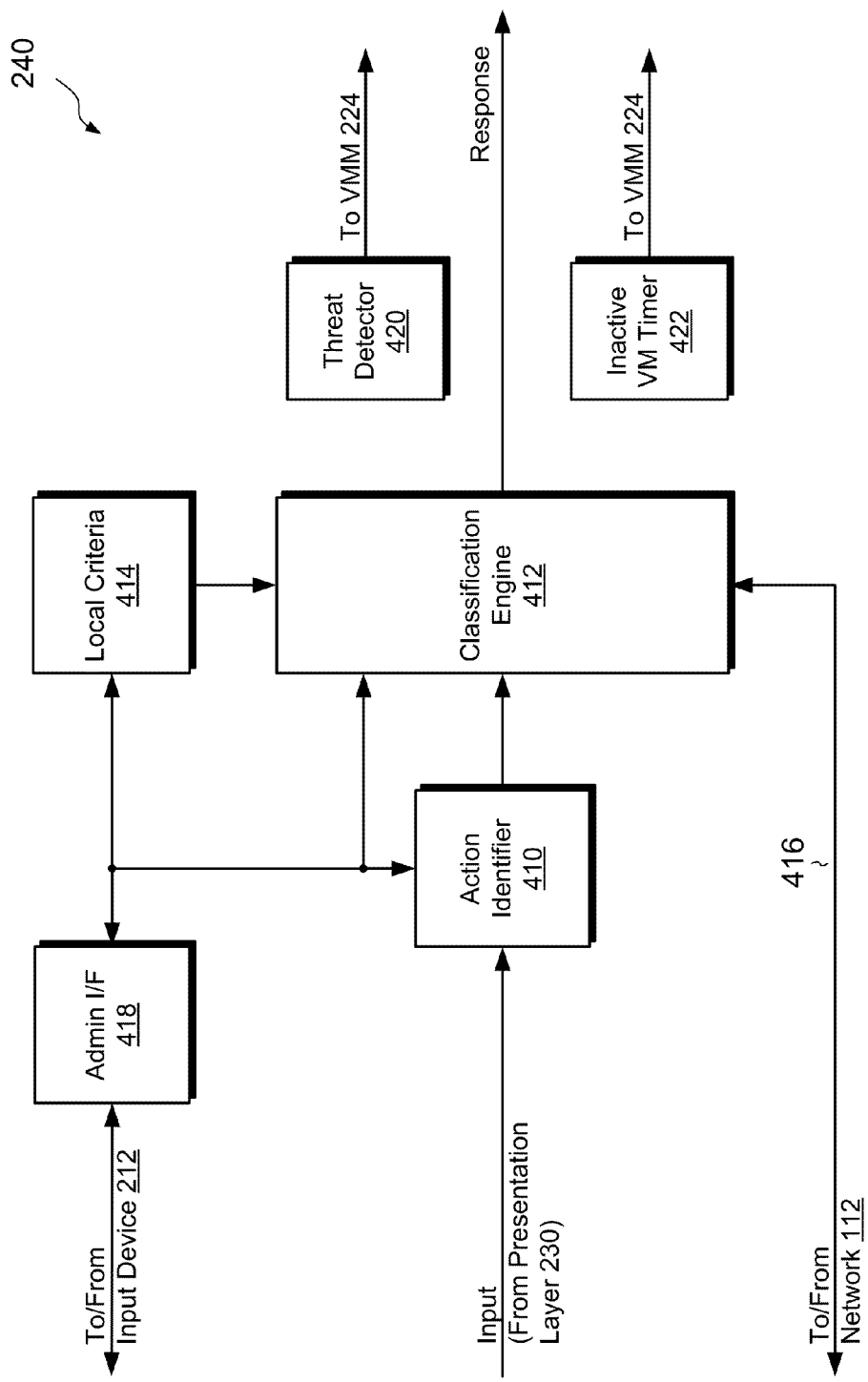
FIG. 4 is a block diagram showing example constituents of the policy engine of FIGS. 2 and 3.

FIG. 4 shows example constituents of the policy engine 240. As shown, the policy engine 240 includes an action identifier 410, a classification engine 412, a local repository of criteria 414, and a connection 416 to the network 112.

The action identifier 410 receives inputs. The inputs are generally received from the presentation layer 230, although they may alternatively be received directly from a user via the input device 212. For each input, the action identifier 410 identifies a computing action specified by the respective input. In one example, the input to the policy engine 240 is a URL. In this case, the action identifier 410 can identify the specified computing action as an instruction to visit a website specified by the URL and to download its contents. In another example, the input to the policy engine 240 is formatted data from an email program. In this case, the action identifier 410 can examine the data, compare it with known patterns, and identify the computing action specified by the data as a request to connect to an email server.

For some inputs, the action identifier 410 can identify the corresponding computing action directly from the input, without requiring any additional information. For other inputs, the action identifier 410 may receive context information from the presentation layer 230 or other software constructs, with both the inputs and the context information being used to identify the computing action.

Once the computing action is identified, a representation of the computing action is sent to the classification engine 212. In some examples, the representation of the computing action is the same as the input. In other examples, the representation is a processed version of the input or information associated with the action specified by the input.

The classification engine 412 receives the representation from the action identifier 210 and proceeds to classify the respective computing action in one of a predetermined number of categories. The number and character of the categories depends on the purpose that the computing device 110 is to serve. For example, if the purpose of the computing device 110 is to implement Red/Green security, only two categories are generally used—trusted and untrusted. The role of the classification engine 412 is then to perform a binary categorization, i.e., to determine whether the action specified by the input is a trusted action or an untrusted action. In another example, the computing device 110 may be used to categorize each input based on the country to which data is to be sent. In this case, a different category can be provided for each and every country. There can be one category for the US, one category for Russia, one category for China, and so forth. Similarly, multiple categories can be provided for distinguishing between different Internet Service Providers, companies that are accessed, or classes of workers that are using the computing device 110 (e.g., managers, staff members, consultants, etc.), for example. Multiple categories can also be provided for distinguishing between different individual users. For example, one category can be provided for User A and another for User B. User A can then always be directed to one particular virtual machine, while User B is always directed to another particular virtual machine. The number and character of the categories is therefore based on how the computing device 110 is to be used, and can vary over a broad range within the scope of the invention.

A local repository of criteria 414 is preferably included with the policy engine 240 to provide a set of criteria for the classification engine 412 to apply in classifying actions. Additionally, or in the alternative, criteria may be obtained from an external source via a connection 416 to the network 112. In one example, the external source is a server that stores policy criteria (such as a corporate security policy) to be used by multiple computing devices configured like the computing device 110. An administrator of the computing device 110 can subscribe to a service that provides security criteria that can be applied by the classification engine 412. In some instances, the policy engine 240 can store some criteria locally and obtain other criteria remotely.

Criteria typically relate to inputs, but they can also relate to other factors, such as the identity of the user, the system environment, known security threats, and others, for example. It is therefore understood that the policy implemented by the policy engine 240 can cover a wide range of criteria. Different policies can be implemented for different users, different organizations, or different situations.

Preferably, the classification engine 412 applies each individual criterion in the set of criteria to the action specified by each input to classify the action in a category, e.g., trusted or untrusted. Classification can be conducted in numerous ways. In one example, the criteria can be expressed as a sequence of conditional statements, such as, "if <condition1> then "trusted," and "if <condition2> then "not trusted." If any criterion applied to the specified action indicates that the action is untrusted, then the classification engine 412 categorizes the action as untrusted, regardless of whether other criteria indicate that the action is trusted. Similarly, if all of the set of criteria are applied to the specified action and none indicate that the action untrusted, then the classification engine 412 categorizes the action as trusted.

Alternatively, the criteria can be expressed in other forms or combined in other ways. For example, criteria may be applied to computing actions using fuzzy logic, Bayesian logic, analog circuitry, neural networks, and the like.

Once the classification engine 412 has classified the specified action, the classification engine 412 issues a "response." The response can take a variety of forms. These may include, for example, directing the specified action to be run on a virtual machine designated for actions in the same category. Directing the virtual machine may include passing it a thread. If no virtual machine in the same category as the action is running, the response can include instantiating a new virtual machine in the action's category. The response can further include directing the newly created virtual machine to perform the specified action.

In addition, the classification engine's response can include instantiating an application on a virtual machine. For example, if the input to the policy engine 240 is a URL and no browser is currently running on the designated virtual machine, the response of the classification engine 412 can include instantiating a browser application on the designated virtual machine and directing the newly running browser application to perform the action (e.g., visit the URL).

The policy engine 240 further includes an administrative interface 418. The administrative interface 418 allows system administrators or other privileged users to load criteria into the local criteria 414 for use by the classification engine 412. Administrators can also check subscribed-to services for threats, or check known-good lists and known-bad lists, and update the criteria accordingly. The interface 418 can also allow system administrators or other privileged users to provide updates for the action identifier 410 and classification engine 412.

In some examples, the policy engine 240 further includes a threat detector 420 and/or an inactive virtual machine timer 422. The threat detector 420 monitors the virtual machines 450a-450n for signs of malicious or abusive activity. Abusive activity can include, for example, a virtual machine running malicious code downloaded from the Internet and executing instructions that continually instantiate new virtual machines. The threat detector 420 can respond to the abusive activity by directing the VMM 224 to shut down the virtual machine from which the activity originates. The threat detector 420 can also inform the VMM 224 to limit the number of new virtual machines that the offending virtual machine is allowed to instantiate. Further remedial actions can include directing the VMM 224 to slow down the processing speed of virtual machines from which abuse originates.

The inactive virtual machine timer 422 coordinates with the VMM 224 to shut down any virtual machines that have been idle for more than some predetermined interval of time. Shutting down inactive virtual machines frees up hardware resources for new virtual machines and/or users.

In one example, the policy engine 240 is implemented as a service VM running a host operating system such as Microsoft Windows. Other operating systems can be used, however, such as Unix, Red Hat Linux, or Mac OSX, for example. The policy engine 240 is preferably persistent, so that it is maintained intact for different user sessions and after power cycling of the computing device 110.

As indicated, some of the criteria used by the policy engine 240 relate to the input and the computing action specified by the input, whereas others relate to other factors. In one example, the policy engine 240 operates using a taxonomy of criteria. The taxonomy of criteria can cover the following five main groups:

1. Physical machine criteria: pertain to one or more physical machines on which the virtual machine environment resides.
2. Virtual machine criteria: pertain to one or more virtual machines in the virtual machine environment.
3. User criteria: related to user identity, authentication, and/or authorization in the virtual machine environment.
4. Data transfer criteria: related to movement of information between virtual machines of the virtual machine environment.
5. Target criteria: related to computing actions that obtain information from outside the virtual machine environment.

Examples of physical machine criteria can include:
Behavioral policies
Intra-layer policies
Black list ("Known Bad Objects" or KBO)
White list (("Known Good Objects" or KGO)
Stack integrity
Sequence integrity
Object requirements
Object authentication (with internal or external services)
Object authorization (with internal or external services)
Logging policies
State requirements
Examples of virtual machine criteria can include:
Behavioral policies (e.g., cannot copy and paste while doing an FTP; cannot visit trusted website if already visiting untrusted website)
Black list (KBO)
White list (KGO)

Stack integrity (e.g., allow user to visit website only if SSL running; or only if drivers signed, hash codes verified, and/or anti-virus software up to date)

Object requirements (e.g., Approved build? When built? Hypervisor present?)

Object authentication (w/Internal or External Services)

Object authorization (w/Internal or External Services)

Logging policies (e.g., only allowed to visit certain site if logging options turned on)

State requirements (e.g., anti-virus software must be running, firewall must be on, and/or machine running in a clean state)

Import/export policies

Examples of user criteria can include:

Authentication (e.g., user validated to a level of trust)

Authorization/attributes (e.g., user is entitled to perform action)

Local rights

Organizational rights

Management rights

The data transfer criteria apply to data movement through the airlock 260. These may include, for example:

Know Bad Pattern (KBP)

Know Good Pattern (KGP)

Metadata (DRM)/Tags (e.g., use tags in inputs, such as "company confidential," to categorize actions)

Process integrity (e.g., do not allow action if either source or destination not allowed)

App integrity (source/destination)

App identity

Process identity (source/destination)

Message integrity (e.g. No malformed messages, or message follows specific taxonomy)

User context

Run-time co-incidence requirements ("concurrence")

State requirements

Encryption/non-encryption

Compression/non-compression

Logging requirements

Examples of the target criteria can include:

Target conditions: app type, target user context, target physical machine context, target virtual machine context, target integrity, target identity Web service conditions: registry, type, physical context, KBWS (Known Bad Web Service—i.e. Consume signatures), protocol, integrity, identity, concurrence conditions, allowed service call type Logging requirements Destination Protocol Application Encryption/non-encryption Compression/non-compression The policy taxonomy described above can be used advantageously in a Red/Green security policy. It may also be used with other policies. It is understood that the criteria from all five groups are generally in effect at the same time and all come into play when classifying a computing action.

Figure 5:
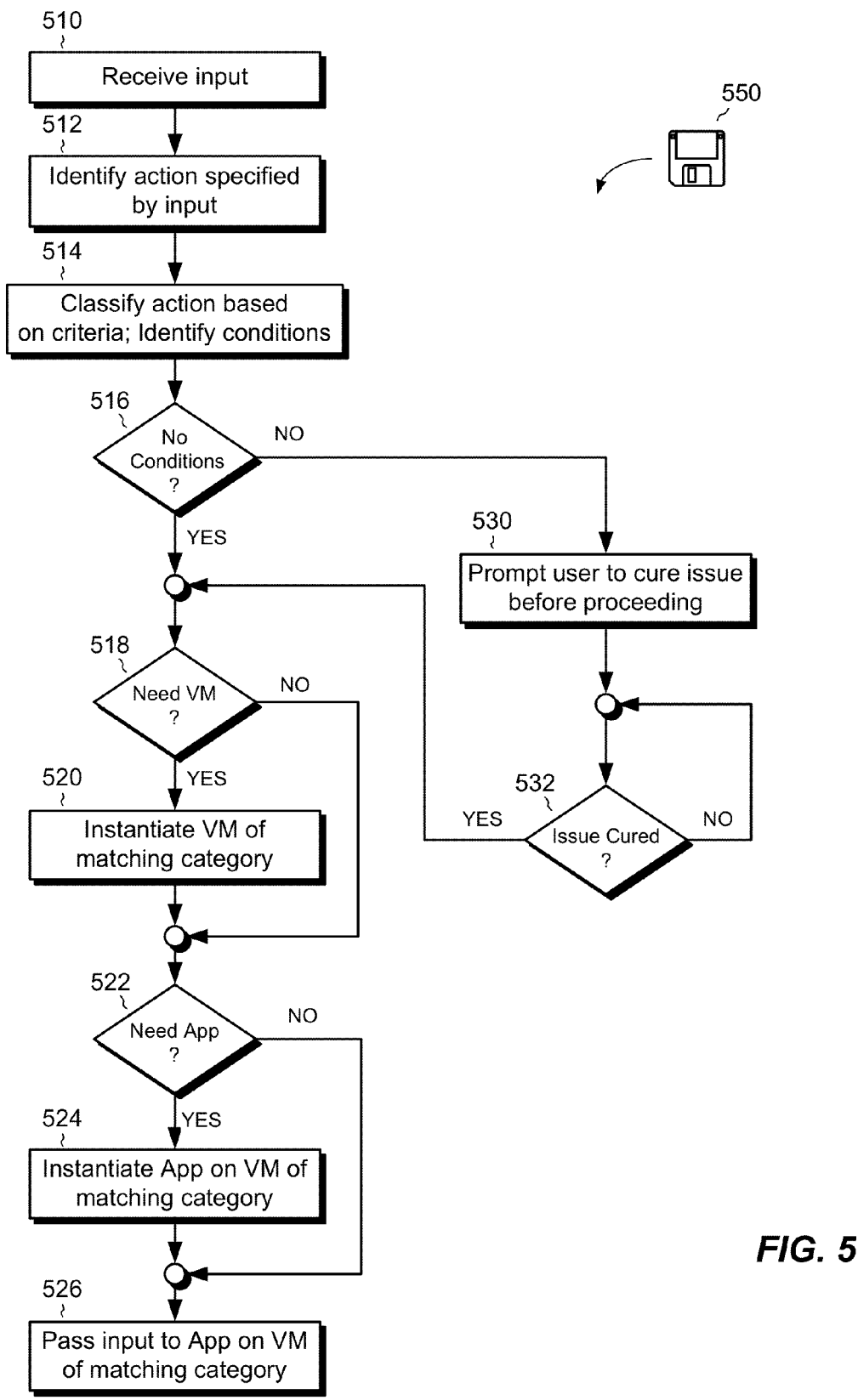
FIG. 5 is a flowchart showing an example process for conducting Red/Green security using the policy engine of FIG. 4.

FIG. 5 shows an example process conducted by the policy engine 240 for implementing Red/Green security in a virtual machine environment. Beginning at step 510, an input is received by the policy engine 240. The input specifies a computing action to be performed. The input can arrive from the presentation layer 230, directly from the input device 212, or from some other source.

At step 512, the policy engine 240, via the action identifier 410, identifies the action specified by the input. For example, if the input is a URL, the corresponding action can be to visit, download, and display the contents of a web page designated by the URL.

At step 514, the classification engine 412 classifies the computing action as belonging to one of multiple predetermined categories. Classification is conducted by applying a set of criteria, obtained from the local repository of criteria 414 and/or from a remote location over the network 112, to the identified action. The classification engine 412 may at this time also identify any conditions for proceeding. Sometimes, computing actions are classified but nevertheless barred from being performed until some condition is met.

Once the category of the specified action is identified, the policy engine 240 determines whether any condition is present that currently prevents the action from being performed (step 516). If no condition is present, the policy engine 240 next determines whether there is already a virtual machine running that has been designated for the category of the specified computing action (step 518). However, if a condition is present, the user is prompted to meet the condition (step 530). The policy engine 240 verifies the condition has been met (step 532) before proceeding to step 518.

An example of a condition is where the policy engine 240 allows a user to visit a trusted website, but only if the user is not concurrently visiting an untrusted website. If the user is visiting a trusted website and has submitted a request to visit an untrusted website, the policy engine 240 can require the user to close the browser window displaying the trusted website (the condition) before starting a new browser session and visiting the untrusted website. The policy engine 240 would then wait for the browser window displaying the trusted website to be closed before proceeding.

If no virtual machine is running in the matching category, the policy engine 240, working cooperatively with the VMM 224, directs a new virtual machine to be instantiated (step 524). The new virtual machine is designated and provisioned for the category of actions identified in step 514.

Operation proceeds to step 522, where the policy engine 240 determines whether the application needed to perform the specified action is running on the matching virtual machine. If the application is not running, the needed application is instantiated on the matching virtual machine (step 524). The policy engine 240 then passes the matching virtual machine the input received at step 510. Alternatively, the policy engine 240 can pass some other information to the matching virtual machine, such as information derived from the input or information describing the computing action to be performed.

Returning to step 522, if the needed application is running, then the instantiating step (step 524) is skipped and control proceeds directly to step 526, where the input is passed to the application running on the matching virtual machine. Returning to step 518, if a virtual machine of the matching category is already running, the step of instantiating a virtual machine is skipped, and control passes directly to step 522.

As shown and described, an improved technique for delegating computing actions among different virtual machines includes a policy engine that receives inputs specifying computing actions to be performed and automatically selects a machine to perform each action. Machine selection is based on a policy, which recognizes multiple categories of computing actions, classifies each input as belonging to one of the categories, and directs each computing activity to a machine designated for performing only that one category of computing actions. The improved technique thereby overcomes inconvenience and potential security risks associated with prior implementations.

While various embodiments of the invention have been particularly shown and described, it will be understood by those skilled in the art that various changes in form and details may be made therein. For example, although embodiments have been described herein in relation to Red/Green security policies, it is understood that the invention is not limited to Red/Green security. Rather, the principles disclosed herein can be applied in any context in which different virtual machines are used for performing different categories of actions.

As shown and described, the policy engine 240 is provided as part of a computing device 110, which also includes a presentation layer 230, hypervisor 222, VMM 224, and virtual machines 250a-250n. This is merely an example, however. Alternatively, the policy engine 240 may be provided on one physical machine and the other software components provided on one or more other physical machines. Different software components, including the different virtual machines 250a-250n, can be distributed across multiple physical machines in any way desired. Also, it is understood that the policy engine 240 can be used with or without a presentation layer 230 or hypervisor 222.

Also, although the policy engine 240 has been described as receiving inputs from human users, the policy engine can also receive inputs from other sources, such as processes or other software constructs running on any of the virtual machines 250a-250n or running on any other component of the computing device 110. Therefore, the inputs received by the policy engine 240 should be understood to include both those originating from humans as well as those originating from machines. Of particular value is the ability of the policy engine 240 to mediate machine-initiated network access. For example, if a process running on one of the machines 250a-250n initiates, independently and without user input, a file transfer to another machine, the policy engine 240 intervenes to ensure compliance with the controlling policy.

Also, the techniques disclosed herein, such as the policy engine 240 and process of FIG. 5, may be embodied in a computer program product including a computer-readable storage medium, such as a magnetic disk, magnetic tape, compact disk, DVD, optical disk, flash memory, Application Specific Integrated Circuit (ASIC), Field Programmable Gate Array (FPGA), and the like. See, for example, the medium 550 shown in FIG. 5. Multiple computer-readable media may be used. The medium (or media) may be encoded with instructions which, when executed on one or more computers or other processors, perform methods that implement the various embodiments described above. Such medium (or media) may be considered an article of manufacture or a machine, and may be transportable from one machine to another.

Various aspects of above-described embodiments may be used alone, in combination, or in a variety of arrangements not specifically set forth in the foregoing. For example, aspects described in one embodiment may be combined in any manner with aspects described in other embodiments. Also, the various methods or processes outlined herein may be encoded as software. The software may be written using any of a number of suitable programming languages and/or programming or scripting tools.

Those skilled in the art will therefore understand that various changes in form and detail may be made to the embodiments disclosed herein without departing from the spirit and scope of the invention as defined by the appended claims.

What is claimed is:

1. A processing apparatus for a virtual machine environment, comprising:
   an input device;
   a controller, coupled to the input device, the controller having a memory and at least one processor, coupled to the memory, for processing information stored in the memory,
   wherein the controller is constructed and arranged to:
      receive multiple inputs, via the input device, each input specifying a computing action to be performed;
      classify the computing action specified by each input in one of multiple predetermined categories of computing actions in accordance with a policy of the virtual machine environment; and
      direct the computing action specified by each input to be performed by a virtual machine configured for performing only the category of computing actions specified by the respective input, including directing computing actions of different categories to different virtual machines,
   wherein, when constructed and arranged to direct, the controller is further constructed and arranged to instantiate a first virtual machine configured for performing only a first category of computing actions, responsive to receiving an input specifying a computing action of the first category when no virtual machine configured for the first category is already running in the virtual machine environment,
   wherein the policy of the virtual machine environment includes a set of criteria, the set of criteria including:
      physical machine criteria pertaining to one or more physical machines on which the virtual machine environment resides;
      virtual machine criteria pertaining to one or more virtual machines in the virtual machine environment;
      user criteria related to any of user identity, authentication, and authorization of the virtual machine environment;
      data transfer criteria related to movement of information between virtual machines of the virtual machine environment; and
      target criteria related to computing actions that obtain information from outside the virtual machine environment.

2. The processing apparatus of claim 1,
   wherein the predetermined categories of computing actions include a category of trusted computing actions and a category of untrusted computing actions, and
   wherein the different virtual machines include a first virtual machine configured for performing only trusted computing actions and a second virtual machine configured for performing only untrusted computing actions.

3. The processing apparatus of claim 2, wherein the controller is constructed and arranged to run a service virtual machine, and wherein the service virtual machine is constructed and arranged to classify the computing action specified by each input.

4. A computer program product that includes a non-transitory computer readable medium that stores instructions which, when executed by a processor, cause the processor to perform a method of processing inputs in a virtual machine environment, the method comprising:
   receiving multiple inputs, each input specifying a computing action to be performed;
   classifying the computing action specified by each input in one of multiple predetermined categories of computing actions in accordance with a policy of the virtual machine environment;

directing the computing action specified by each input to be performed by a virtual machine configured for performing only the category of computing actions specified by the respective input, including directing computing actions of different categories to different virtual machines;

receiving an instruction to copy information from a first virtual machine;

receiving an instruction to paste the copied information into a second virtual machine;

executing a set of policy tests in response to receiving the instruction to paste the copied information; and allowing the copied information to be pasted into the second virtual machine only if the set of policy tests do not prohibit the copied information from entering the second virtual machine, wherein the policy of the virtual machine environment includes a set of criteria, the set of criteria including:

physical machine criteria pertaining to one or more physical machines on which the virtual machine environment resides;

virtual machine criteria pertaining to one or more virtual machines in the virtual machine environment;

data transfer criteria related to movement of information between virtual machines of the virtual machine environment; and target criteria related to computing actions that obtain information from outside the virtual machine environment.

5. The computer program product of claim 4, wherein the predetermined categories of computing actions include a category of trusted computing actions and a category of untrusted computing actions, and wherein the different virtual machines include a first virtual machine configured for performing only trusted computing actions and a second virtual machine configured for performing only untrusted computing actions.

6. The computer program product of claim 5, wherein the act of classifying the computing action specified by each input is performed by a service virtual machine running in the virtual machine environment.

7. The computer program product of claim 5, wherein the computing action specified by the input is forbidden by the policy of the virtual machine environment, and the method further comprises requiring a user to perform an action before the directing step can proceed.

8. The computer program product of claim 5, wherein the act of directing further includes:

directing the virtual machine to which the computing action is directed to instantiate a user application; and supplying the user application with information derived from the respective input received.

9. The computer program product of claim 5, wherein the method further comprises detecting abusive activity of a running program construct on any of the virtual machines and taking action to remediate the abusive activity, wherein the action includes limiting a number of new virtual machines that the running program construct can instantiate.

10. A processing method for a virtual machine environment, comprising:

receiving multiple inputs, each input specifying a computing action to be performed;

classifying the computing action specified by each input in one of multiple predetermined categories of computing actions in accordance with a policy of the virtual machine environment; and directing the computing action specified by each input to be performed by a virtual machine configured for performing only the category of computing actions specified by the respective input, including directing computing actions of different categories to different virtual machines, wherein the act of directing includes instantiating a first virtual machine configured for performing only a first category of computing actions, responsive to receiving an input specifying a computing action of the first category when no virtual machine configured for the first category is already running in the virtual machine environment, wherein the policy of the virtual machine environment includes a set of criteria, and the set of criteria are obtained from any of (i) a computer in the virtual machine environment, (ii) a computer remote from the virtual machine environment but operatively connected to the virtual machine environment over a network, and (iii) a combination of (i) and (ii), and wherein the set of criteria includes:

physical machine criteria pertaining to one or more physical machines on which the virtual machine environment resides;

virtual machine criteria pertaining to one or more virtual machines in the virtual machine environment;

user criteria related to any of user identity, authentication, and authorization of the virtual machine environment;

data transfer criteria related to movement of information between virtual machines of the virtual machine environment; and target criteria related to computing actions that obtain information from outside the virtual machine environment.

11. The processing method of claim 10, wherein the act of directing further includes instantiating a second virtual machine configured for performing only a second category of computing actions, responsive to receiving an input specifying a computing action of the second category when no virtual machine configured for the second category is already running in the virtual machine environment.

12. The processing method of claim 11, further comprising destroying any of the first and second virtual machines after at a period of inactivity of the respective virtual machine or after a security risk is detected on the respective virtual machine.

13. The processing method of claim 10, wherein the predetermined categories of computing actions include a category of trusted computing actions and a category of untrusted computing actions, and wherein the different virtual machines include a first virtual machine configured for performing only trusted computing actions and a second virtual machine configured for performing only untrusted computing actions.

14. The processing method of claim 13, wherein the act of classifying the computing action specified by each input is performed by a service virtual machine running in the virtual machine environment.

15. The processing method of claim 13, wherein the computing action specified by the input is forbidden by the policy of the virtual machine environment, and the method further comprises requiring a user to perform an action before the directing step can proceed.

16. The method of claim 15, wherein requiring a user to perform an action before the directing step can proceed includes requiring that the user to close a browser window displaying a trusted website before starting a new browser session and visiting an untrusted website.

17. The processing method of claim 13, wherein the act of directing further includes:
   directing the virtual machine to which the computing action is directed to instantiate a user application; and
   supplying the user application with information derived from the respective input received.

18. The processing method of claim 13, further comprising detecting abusive activity of a running program construct on any of the virtual machines and taking action to remediate the abusive activity, wherein the action includes limiting a number of new virtual machines that the running program construct can instantiate.

19. The processing method of claim 13, further comprising:
   receiving an instruction to copy information from the first virtual machine;
   receiving an instruction to paste the copied information into the second virtual machine;
   executing a set of policy tests in response to receiving the instruction to paste the copied information; and
   allowing the copied information to be pasted into the second virtual machine only if the set of policy tests do not prohibit the copied information from entering the second virtual machine.

20. The processing method of claim 10, further comprising identifying the computing action specified by each input, wherein the act of classifying includes evaluating the computing action specified by the input against the set of criteria.

21. The method of claim 10,
   wherein the multiple predetermined categories of computing actions consist of trusted activities and untrusted activities, and
   wherein directing the computing action specified by each input to be performed by a virtual machine configured for performing only the category of computing actions specified by the respective input includes directing trusted activities only to a virtual machine configured to perform trusted activities and directing untrusted activities only to a virtual machine configured to perform untrusted activities.

* * * * *